(12) United States Patent
Nada et al.

(10) Patent No.: US 6,704,309 B1
(45) Date of Patent: Mar. 9, 2004

(54) INTERNET TELEPHONE APPARATUS AND INTERNET TELEPHONE GATEWAY SYSTEM

(75) Inventors: Noriaki Nada, Chikushino (JP); Takao Miyazaki, Dazaifu (JP); Kazuo Yahiro, Fukuoka-ken (JP); Toshinori Yamagichi, Fukuoka (JP); Takuji Tujigawa, Fukuoka-ken (JP); Yasuyuki Nishioka, Dazaifu (JP); Yuji Jodoi, Fukuoka (JP); Hidetoshi Hayashida, Fukuoka (JP), JPX; Daisuke Wada, Kasuga (JP); Toru Imamura, Kasuga (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 0 days.

(21) Appl. No.: 09/216,736

(22) Filed: Dec. 21, 1998

(30) Foreign Application Priority Data

May 28, 1998 (JP) ............................................ 10-147082
Jul. 10, 1998 (JP) ............................................ 10-195247

(51) Int. Cl.[7] .............................................. H04L 12/56
(52) U.S. Cl. .................... 370/389; 370/352; 370/401
(58) Field of Search ................................ 370/352, 353, 370/354, 355, 356, 401, 402, 403, 404, 405, 465, 525, 526, 468, 389, 351, 463, 466, 467, 503

(56) References Cited

U.S. PATENT DOCUMENTS

| | | | | |
|---|---|---|---|---|
| 5,185,783 A | * | 2/1993 | Takahashi et al. | 379/93.9 |
| 5,436,895 A | * | 7/1995 | Matsumoto | 370/391 |
| 5,708,663 A | * | 1/1998 | Wright et al. | 370/524 |
| 5,805,587 A | * | 9/1998 | Norris et al. | 370/352 |
| 5,828,666 A | * | 10/1998 | Focsaneanu et al. | 370/389 |
| 5,838,682 A | * | 11/1998 | Dekelbaum et al. | 370/401 |
| 5,940,598 A | * | 8/1999 | Strauss et al. | 370/352 |
| 6,075,796 A | * | 6/2000 | Katseff et al. | 370/466 |
| 6,122,357 A | * | 9/2000 | Farris et al. | 379/201.02 |
| 6,125,177 A | * | 9/2000 | Whittaker | 370/243 |
| 6,236,653 B1 | * | 5/2001 | Dalton et al. | 370/352 |
| 6,243,373 B1 | * | 6/2001 | Turock | 370/352 |
| 6,269,095 B1 | * | 7/2001 | Neubauer et al. | 370/352 |
| 6,295,293 B1 | * | 9/2001 | Tonnby et al. | 370/389 |
| 6,320,857 B1 | * | 11/2001 | Tonnby et al. | 370/352 |
| 6,349,096 B1 | * | 2/2002 | Liu et al. | 370/352 |
| 6,515,996 B1 | * | 2/2003 | Tonnby et al. | 370/401 |

FOREIGN PATENT DOCUMENTS

| | | |
|---|---|---|
| WO | 9707626 | 2/1997 |
| WO | 9747118 | 12/1997 |

* cited by examiner

Primary Examiner—Dang Ton
Assistant Examiner—Phuc Tran
(74) Attorney, Agent, or Firm—Stevens, Davis, Miller & Mosher, LLP

(57) ABSTRACT

An Internet telephone apparatus which is capable of processing an Internet connection to an Internet telephone or to personal computer communications without requiring the installation of an additional public line, so that a cost for extension of a line and maintenance of the extended line can be eliminated. This Internet telephone apparatus has an incoming call determination unit for determining, based on information in a call setting message from a user, generated when a call is originated, whether the call is an incoming call directed to an access server for controlling communications such as personal computer communications or the like or an incoming call directed to an Internet telephone control unit for controlling the Internet telephone.

1 Claim, 11 Drawing Sheets

INTERNET TELEPHONE APPARATUS AND INTERNET TELEPHONE GATEWAY SYSTEM

BACKGROUND OF THE INVENTION

1. Field of the Invention

The present invention relates to an Internet telephone apparatus for connecting an Integrated Service Digital Network (ISDN) to an Internet network in an internet telephone system which replaces a portion of communication services utilizing a public line such as a telephone call, facsimile (FAX) transmission, and so on with communication services through the Internet network.

2. Description of Related Art

In recent years, the Internet telephone system has been developed, taking advantage of the Internet, and ITU-T (International Telecommunication Union-Telecommunication Standardization Sector) has also rounded off international recommendations for the Internet telephone system, and communications of images, voice, data and so on, utilizing the Internet.

In the following, a conventional Internet telephone system and a conventional Internet telephone apparatus will be described with reference to the accompanying drawings.

FIG. 1 illustrates the configuration of a conventional Internet telephone system.

Referring specifically to FIG. 1, the Internet telephone system comprises telephones 7, 8 of users who may utilize Internet telephones; an Internet network 4; Integrated Service Digital Networks (ISDN) 5, 6; Internet telephone apparatus 21, 22 for converting a normal telephone communication to an Internet telephone communication; an Internet telephone control center 3 dedicated to management and connection/disconnection control for Internet telephone apparatus located in respective areas; personal computers 11, 12 of users for utilizing the Internet for purposes of personal computer communications or the like; and access servers 9, 10 for providing dial-up IP connections to the personal computer 11 and the personal computer 12, respectively.

FIG. 2 illustrates a functional block diagram of the conventional Internet telephone apparatus 21 or 22.

Referring specifically to FIG. 2, the Internet telephone apparatus 21 or 22 comprises a Layer 1 control unit 42 for performing the control related to Layer 1; a Layer 2 control unit 43 for performing the control related to Layer 2; and a Layer 3 control unit 44 for performing the control related to Layer 3, each of which controls a connection of the Internet telephone apparatus 21 or 22 with the ISDN 5 or 6. Here, a layer refers to a layer in the seven-layer model of the open system interconnection (OSI), wherein Layer 1 refers to a physical layer for defining the communication rate, transmission scheme, transmission codes, and so on; Layer 2 to a data link layer for performing the formation of signal units, detection of transmission errors, retransmission control, flow control on a signal data link, and so on; and Layer 3 to a network layer for performing signal message routing, distribution of signal messages, selection and release of a communication path, and so on. In the ISDN, the control related to Layer 1 is defined by ITU-T Recommendations I.430, I.431, and so on; the control related to Layer 2 is defined by ITU-T Recommendations Q.920, Q.921, and so on; and the control related to Layer 3 is defined by ITU-T Recommendations Q.930, Q.931, and so on. An internet telephone control unit 45 in the Internet telephone apparatus 21 or 22 is provided for compress/decompress of a voice (audio) signal transmitted thereto from a telephone through the ISDN 6, connection/disconnection and control for the Internet telephone control center 3 or another Internet telephone apparatus through the Internet network, and so on. A system control unit 41 generally controls the Layer 1 control unit 42, the Layer 2 control unit 43, the Layer 3 control unit 44, and the Internet telephone control unit 45.

FIG. 3 shows signal scheme specifications for a frame format in the ISDN.

In FIG. 3, a flag sequence is an information element added before and after a frame for identifying the frame; an address field is an information element for identifying a Layer 2 link as well as for identifying whether the frame is a command (for instructing the destination to execute a particular function) or a response (for reporting an executed operation and the state after the execution with respect to one or a plurality of commands); a control field is an information element used to transfer the type of a command or a response and a sequence number for executing information transfer and monitoring functions as well as a control function on a Layer 2 link; an information field is an information element for setting therein information to be actually transferred; and a frame check sequence is an information element for setting therein redundancy data for checking errors in the frame. The Layer 2 control unit 43 performs control for commands and responses based on information in the address field and the control field, as well as perform control for error detection, repetitive request for information, and so on based on information in the frame check sequence. The Layer 3 control unit performs routing of a signal message, distribution of a signal message, selection and release of a communication path, and so on based on information in the information field.

For transferring a frame, the flag sequence, the address field, the control field, the information field, the frame check sequence, and the flag sequence are sequentially sent in this order from the top octet to the lowest octet. Upon originating a call, information elements related to a call setting message including a call number information element, a destination number information element, a transmission capability information element, a source sub-address information element, a destination sub-address information element, a lower layer alignment information element, a user-to-user information element, and so on are set in the information field. Here, the call number information element includes an information element for identifying an individual call when a plurality of calls are simultaneously handled; the destination number information element includes an information element indicative of a telephone number of the destination side; the transmission capability information element includes an information element for identifying whether an associated call is a voice communication or a digital (data) communication; the source sub-address information element includes an information element indicative of a sub-address number on the source side (a sub-address number for identifying the source of a call within a plurality of terminals connected to a single ISDN line); the destination sub-address information element includes an information element indicative of a sub-address number on the destination side (a sub-address number for identifying the destination of a call within a plurality of terminals connected to a single ISDN line, as opposed to the source sub-address); the lower layer alignment information element includes an information element for notifying detailed information on a voice encoding scheme, data protocol, and so on; and the user-touser information element includes an information element used to communication information between users. The transmission capability information element further includes information elements such as information transfer rate (from the destination to the source) information element; a user information Layer 1 protocol information element; a user rate information element; and so on, while the lower layer alignment information element further includes information elements such as an information transfer rate (from the destination to the source) information element, a Layer 1 protocol identification information element; a user rate information element; and so on.

Now, the operation of the conventional Internet telephone apparatus is described with reference to FIGS. 1 to 3. When the users speak between the telephone 7 and the telephone 8, a call is originated from the originating telephone 7 to the Internet telephone apparatus 21 through the ISDN 5, and the Internet telephone apparatus 21 responds to the call to enter a telephone communication state utilizing the ISDN 5.

In this event, the information field including information elements related to a call setting message such as the destination number information element, the transmission capability information element, the source sub-address information element, the destination sub-address information element, the lower layer alignment information element, the user-to-user information element and so on, defined by the frame format as illustrated in FIG. 3, is transferred to the Internet telephone apparatus 21 through the ISDN 5.

Next, the Internet telephone apparatus 21 prompts the user of the telephone 7 to input an authentication number, the telephone number of the destination, and so on through voice guidance. With the authentication number and the telephone number of the destination transmitted from the telephone 7, the Internet telephone apparatus 21 confirms the authentication number of the user in the Internet telephone control center 3 through the Internet network 4, and then performs a connection control, including the passing of the destination telephone number, and so on, with the Internet telephone apparatus 22. The Internet telephone apparatus 22 originates a call to the called telephone 8, with the received destination telephone number, through the ISDN 6. When the user of the telephone 8 hooks off, a telephone communication state is entered between the Internet telephone apparatus 22 and the telephone 8 through the ISDN 6. Subsequently, voice signals from the telephones 7, 8 are compressed/decompressed by voice compress/decompress devices in the Internet telephone apparatus 21, 22, so that compressed voice data is transmitted and received between the Internet telephone apparatus 21, 22 through the Internet network 4, whereby the user of the telephone 7 can speak over the telephone with the user of the telephone 8.

In the conventional Internet telephone apparatus, however, when an Internet telephone service provider (hereinafter, referred to as the "ITSP") for providing users with accesses to an Internet network provides the Internet telephone service, another line must be installed exclusively for an Internet telephone apparatus in addition to a public line for an access server, thereby presenting a problem of requiring a cost for additionally installing a line and an extra expense for maintenance of the newly installed line. In addition, a dedicated line must be always reserved exclusively for the Internet telephone in spite of the fact that the frequency of accesses from users largely varies depending on time zones, thereby implying a problem that the line cannot be efficiently utilized.

SUMMARY OF THE INVENTION

The present invention has been made to solve the problems inherent to the prior art, and its object is to provide an Internet telephone apparatus which is capable of Internet connection processing both for an Internet telephone service and for a personal computer communication service through a single telephone line by switching the line between an Internet telephone control unit and an access server, upon receiving an incoming call, thereby achieving an efficient utilization of a telephone line through switching and sharing of the telephone line.

DESCRIPTION OF THE PREFERRED EMBODIMENTS

Embodiment 1

Figure 1:
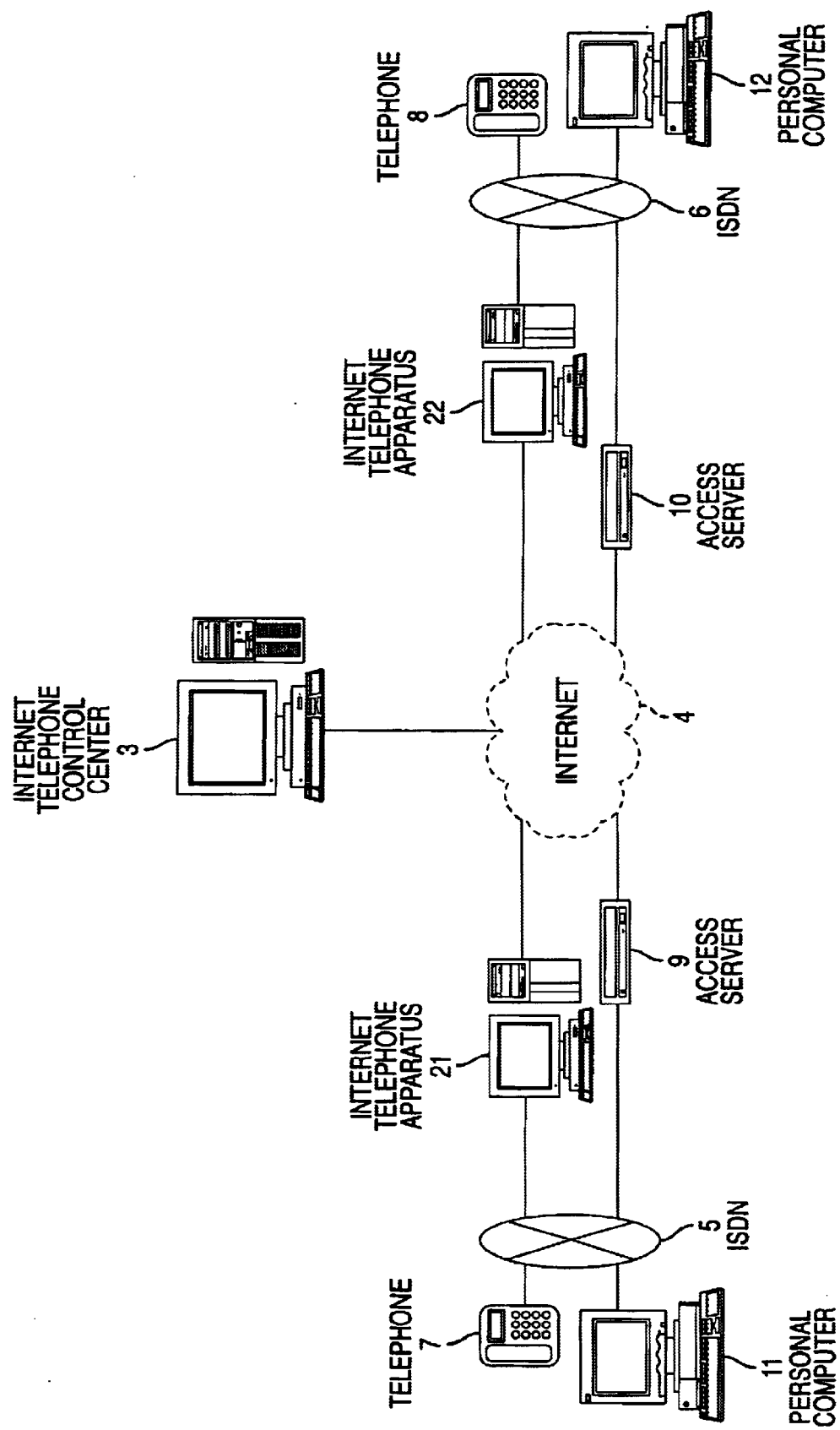
FIG. 1 illustrates the configuration of a conventional Internet telephone system.
Figure 2:
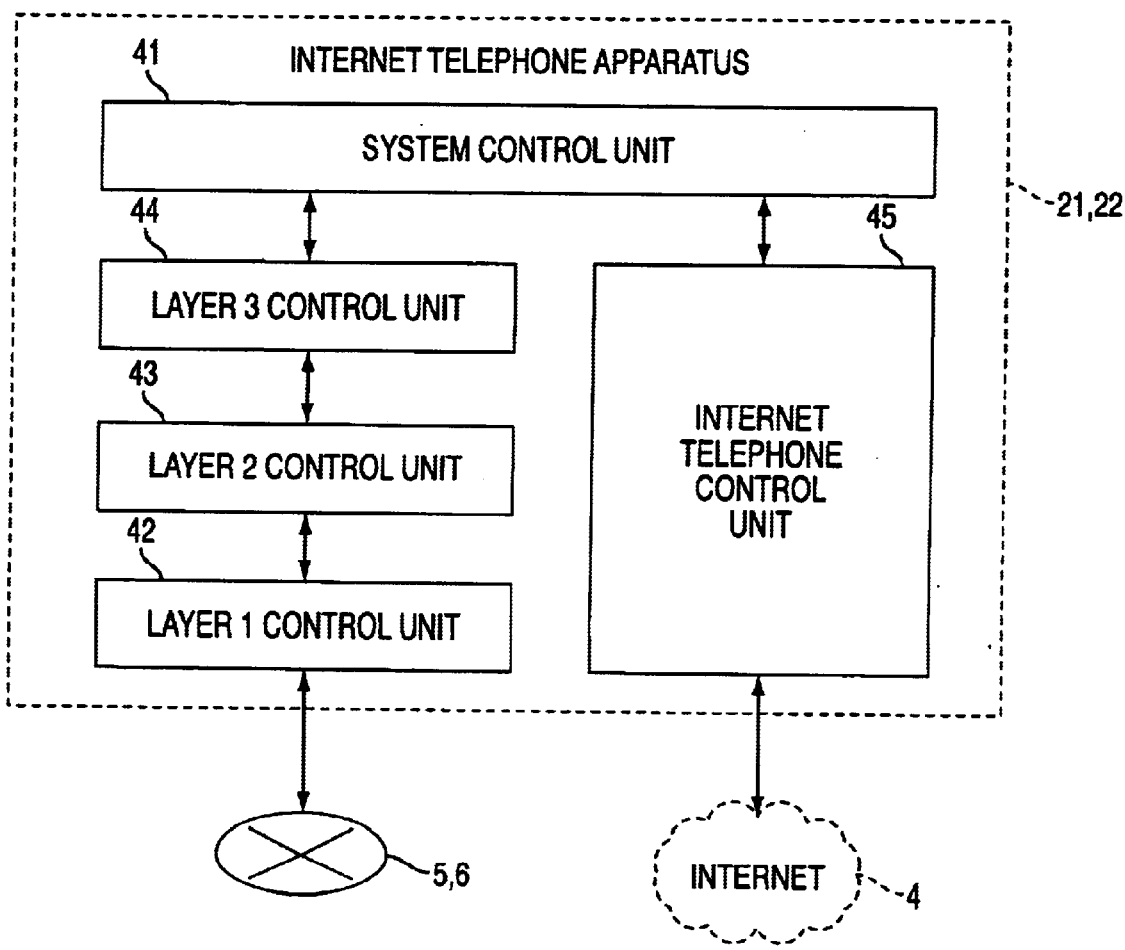
FIG. 2 is a functional block diagram of a conventional Internet telephone apparatus.
Figure 3:
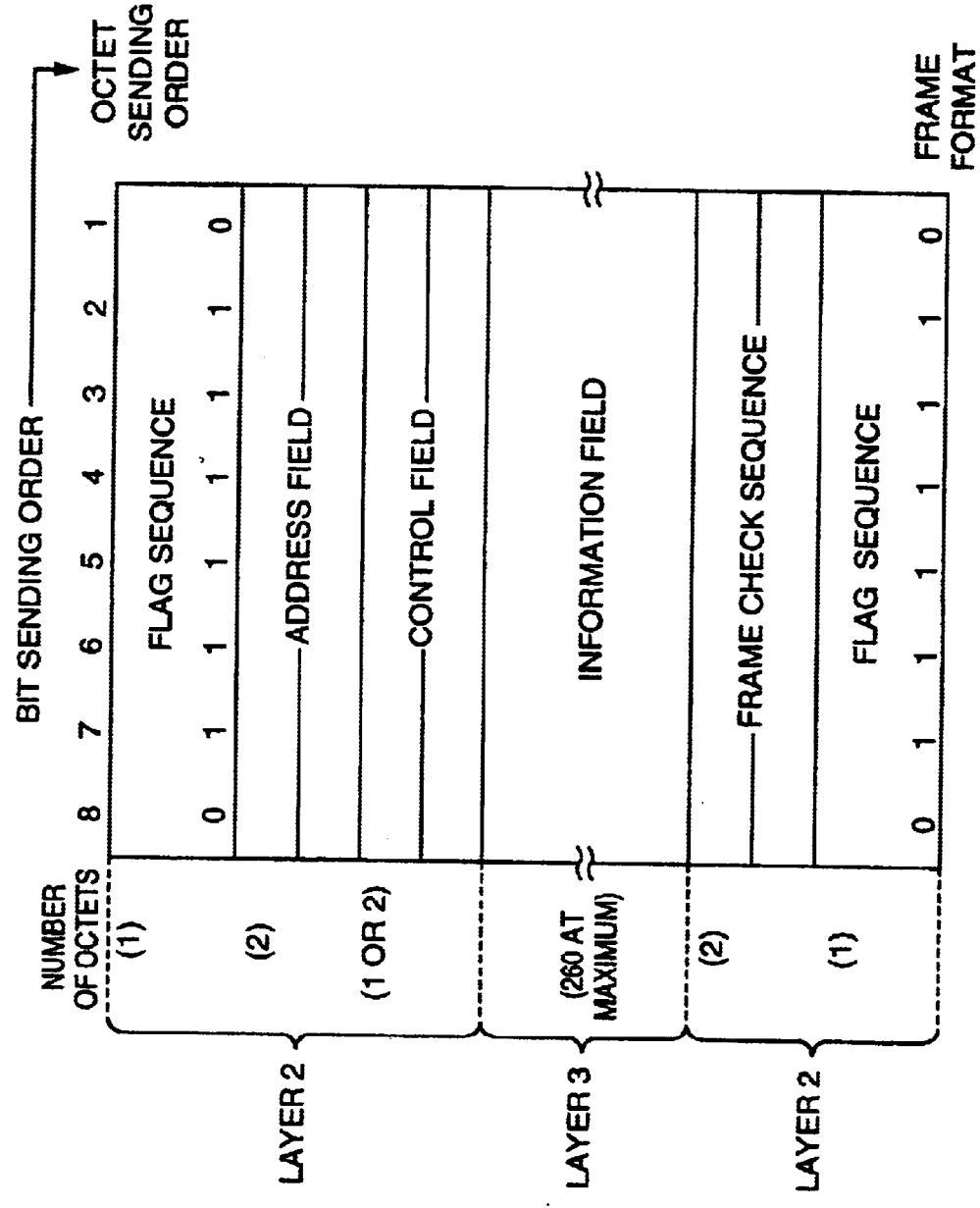
FIG. 3 shows signal scheme specifications for a frame format in the ISDN.
Figure 4:
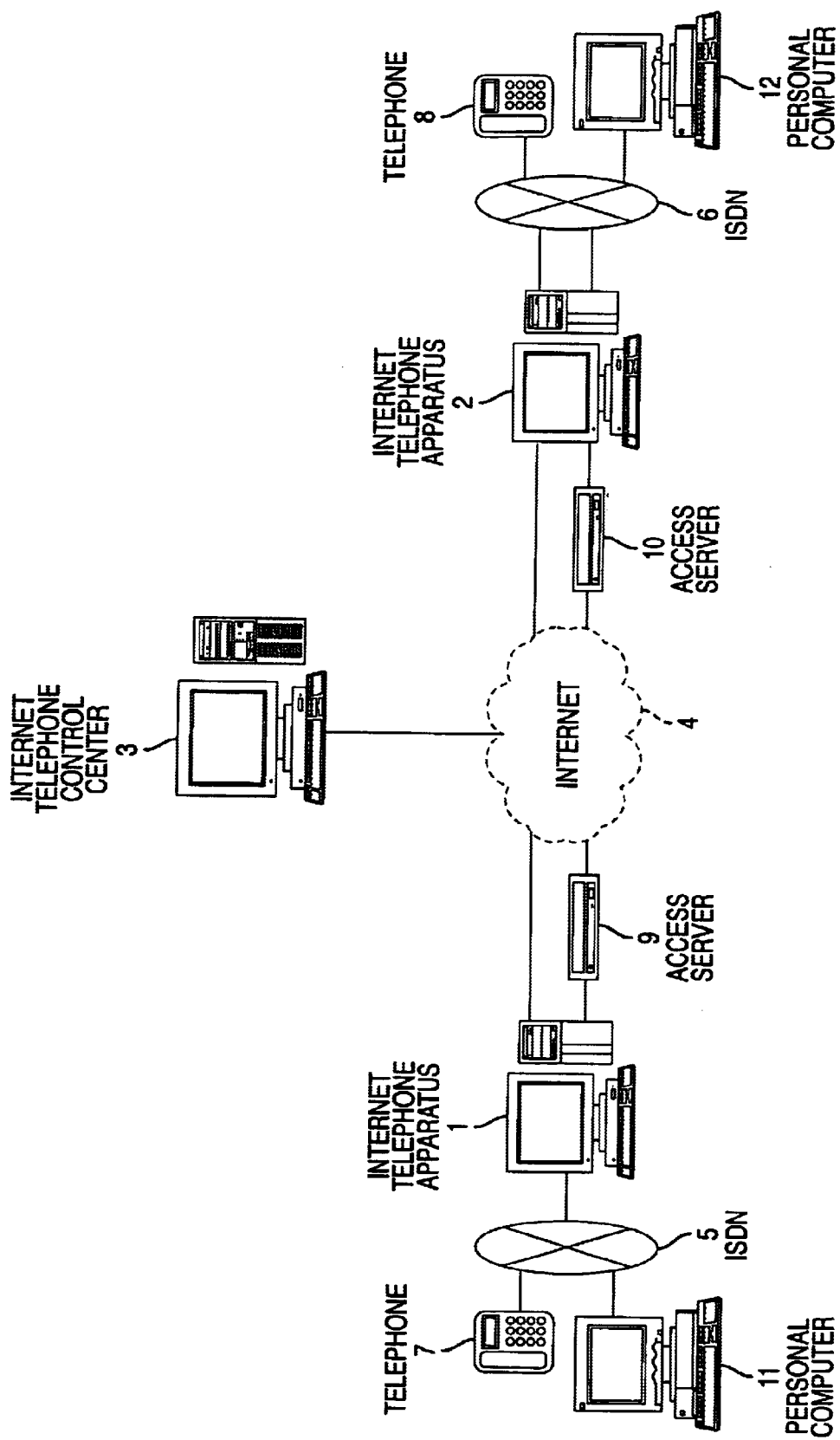
FIG. 4 illustrates the configuration of an Internet telephone system which may be configured based on Internet telephone apparatus according to Embodiments 1–9 of the present invention.

FIG. 4 illustrates the configuration of an Internet telephone system which is configured based on an Internet telephone apparatus of the present invention.

Referring specifically to FIG. 4, the Internet telephone system comprises telephones 7, 8 of users; ISDNs 5, 6; personal computers 11, 12 of the users for utilizing the Internet such as personal computer communications and so on; access servers 9, 10 for providing dial-up IP connections to respective personal computers to be connected to the ISDNs; Internet telephone apparatus 1, 2 each for determining whether an incoming call from the ISDN 5 or 6 is an incoming call directed to the access server or an incoming call directed to the Internet telephone to perform a transmission control between the ISDN and the access server when it is an incoming call directed to the access server and to perform a transmission/reception control for an Internet telephone apparatus on the calling party or on the called party or an Internet telephone control center 3 when it is an incoming call directed to the Internet telephone; and the Internet telephone control center 3 dedicated to management and connection/disconnection control for respective Internet telephone apparatus located in respective areas.

Figure 5:
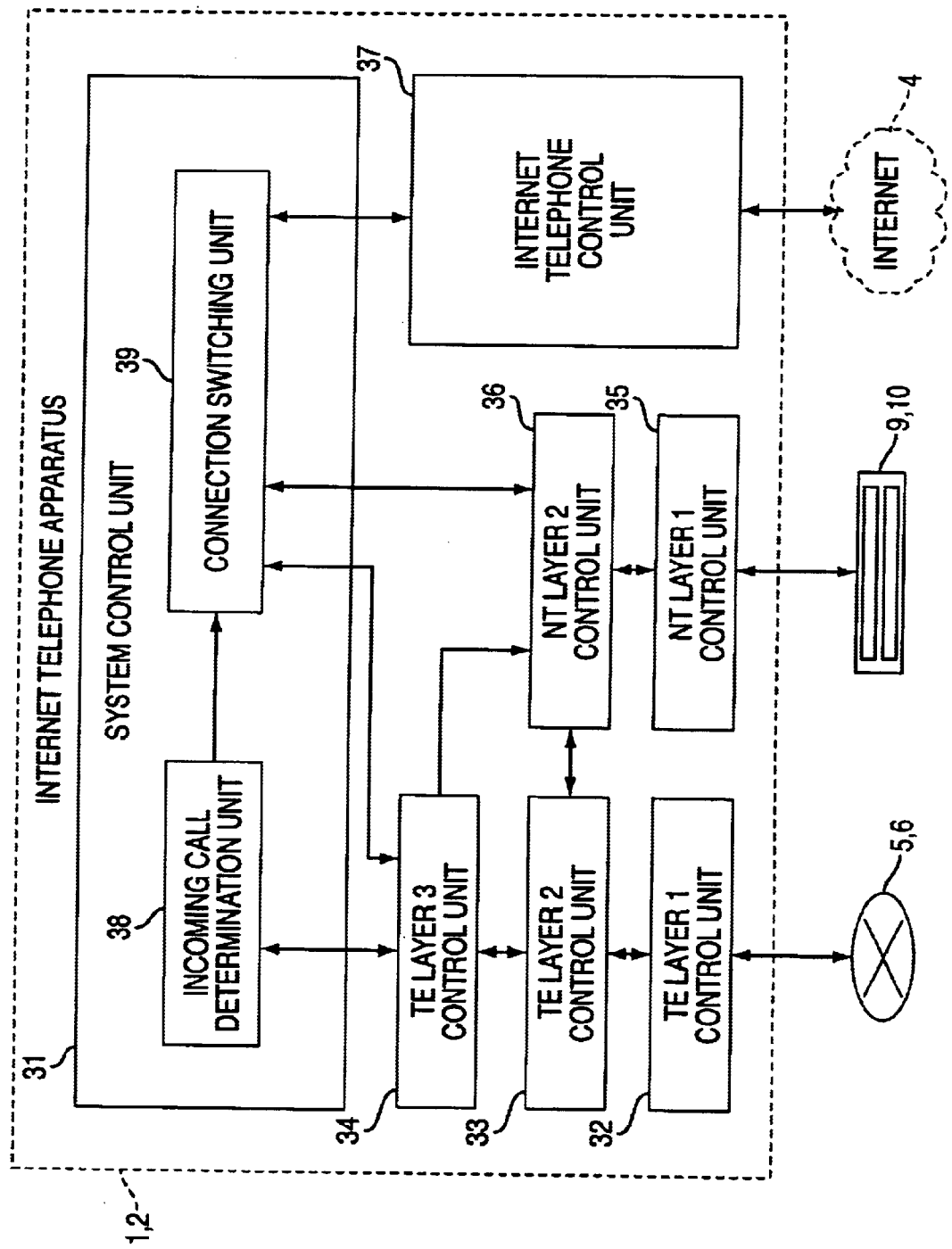
FIG. 5 is a functional block diagram of the Internet telephone apparatus according to Embodiments 1–9 of the present invention.

FIG. 5 is a functional block diagram of an Internet telephone apparatus of the present invention.

Referring specifically to FIG. 5, the Internet telephone apparatus comprises a TE layer 1 control unit 32 connected to the ISDN for controlling Layer 1 on the terminal side defined by ITU-T Recommendations I.430, I.431, and so on; a TE Layer 2 control unit 33 for controlling data links on Layer 2 on the terminal side defined by ITU-T Recommendations Q.920, Q.921, and so on; and a TE layer 3 control unit 34 for controlling calls on Layer 3 on the terminal side defined by ITU-T Recommendation Q.930, Q.931, and so on. An NT Layer 1 control unit 35 is connected to an access server, and controls Layer 1 on the network side defined by ITU-T Recommendations I.430, I.431, and so on. An NT Layer 2 control unit 36 controls a data link on Layer 2 on the network side defined by ITU-T Recommendations Q.920, Q.921, and so on. An Internet telephone control unit 37 compresses and decompresses a voice (audio) signal transmitted thereto through the ISDN 5 or 6, and performs connection/disconnection control and so on with the Internet telephone control center 3 or an Internet telephone apparatus on the calling party or on the called party through the Internet network. A system control unit 31 generally controls the TE Layer 1 control unit 32, the TE Layer 2 control unit 33, the TE Layer 3 control unit 34, the NT Layer 1 control unit 35, the NT Layer 2 control unit 36, and the Internet telephone control unit 37, and determines whether an incoming call from the ISDN is an incoming call directed to the access server or an incoming call directed to the Internet telephone. The system control unit 31 includes an incoming call determination unit 38 and a connection switching unit 39.

In the following, a call origination processing method will be explained with reference to FIGS. 6 and 7 in connection with the Internet telephone apparatus configured as described above.

Figure 6:
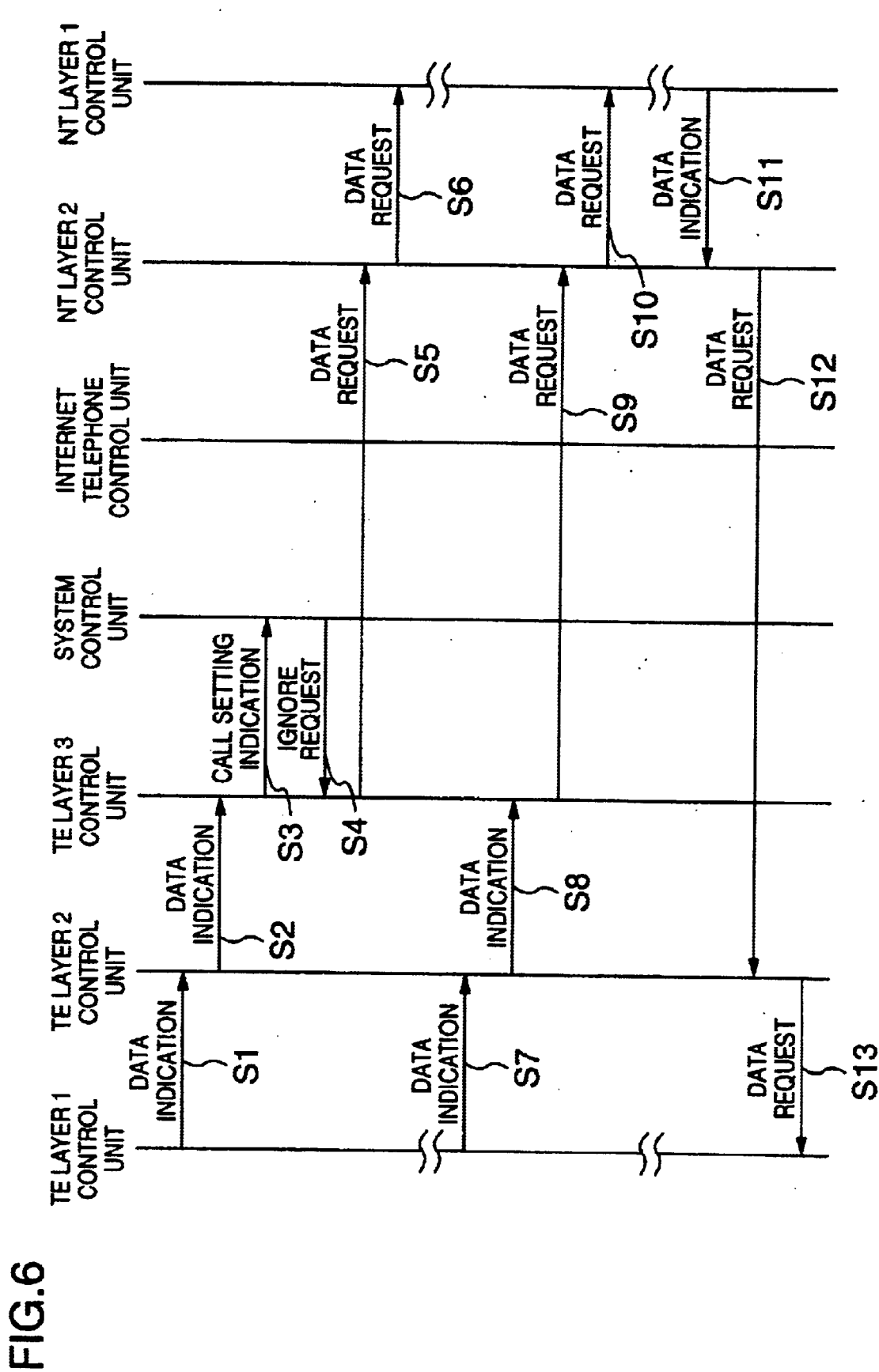
FIG. 6 is an operational sequence diagram for the Internet telephone apparatus according to Embodiments 1–9 of the present invention, when an incoming call is directed an access server.

FIG. 6 is an operational sequence diagram for the Internet telephone apparatus according to Embodiment 1 of the present invention when an incoming call is directed to the access server. FIG. 7 is an operational sequence diagram for the Internet telephone apparatus according to this embodiment when an incoming call is directed to the Internet telephone.

Referring to FIG. 6, explanation is first given of an operational procedure involved in a connection of the personal computer 11 to the Internet through the access server 9, made by the user of the personal computer 11 with an aim to utilize the Internet for normal personal computer communications or the like.

The user of the personal computer 11 originates a call to an access point provided by an ITSP through the ISDN 5 for accessing the Internet. When the Internet telephone apparatus 1 receives a call setting message transmitted in response to the call thus originated, the TE Layer 1 control unit 32 first transmits a data indication S1 to the TE Layer 2 control unit 33. The TE Layer 2 control unit 33 performs processing such as detection of a Layer 2 header (an address field and a control field) and error detection (error detection using a frame check sequence) on information in the data indication S1, and transmits the processed data indication S1 to the TE Layer 3 control unit 34 as a data indication S2. The TE Layer 3 control unit 34 in turn analyzes the data indication S2 to recognize that this is a call setting message indicative of an incoming call, and responsively transmits a call setting indication S3 including Layer 3 information elements (information elements related to the call setting message and so on) to the system control unit 31 as well as accumulates the data indication S2. The incoming call determination unit 38 of the system control unit 31, upon receiving the call setting indication S3, compares a destination number information element included in the received call setting indication S3 with a previously set dial-in number for an Internet telephone, and determines that this is an incoming call directed to the access server 9 from the comparison result showing that they are not coincident. The connection switching unit 39 sends an ignore request S4 to the TE Layer 3 control unit 34 on the basis of this determination. The TE Layer 3 control unit 34, upon receiving the ignore request S4, sends to the NT Layer 2 control unit 36 the call setting message of the accumulated data indication S2 as a data request S5. The NT Layer 2 control unit 36 adds a Layer 2 header, an error correcting code, and so on to the data request S5 to produce a data request S6, and then sends the data request S6 to the NT Layer 1 control unit 35. Consequently, the NT Layer 1 control unit 35 sends incoming call information from the personal computer 11 to the access server 9.

If the TE Layer 3 control unit 34 receives another message from the ISDN after receiving the ignore request S4 from the system control unit 31, the TE Layer 3 control unit 34 determines that the message is associated with a call directed to the access server 9 when a call number information element of a data indication S8 for this message (the data indication S8 is sent from the TE Layer 2 control unit 33 in response to a data indication S7 sent from the TE Layer 1 control unit 32 which has received the message) is coincident with the call number information element of the data indication S2 of the call setting message, for which the ignore request S4 has been issued. Then, the TE Layer 3 control unit 34 transmits a data request S9 to the NT Layer 2 control unit 36. The NT Layer 2 control unit 36, which has received the data request S9, transmits a data request S10 to the NT Layer 1 control unit 35, thereby causing the NT Layer 1 control unit 35 to send the message to the access server 9.

Subsequently, the contents received by the TN Layer 1 control unit 35 from the access server 9 are also transmitted to the NT Layer 2 control unit 36 through a data indication S11, and the NT Layer 2 control unit 36 transmits the same contents to the TE Layer 2 control unit 33 through a data request S12. Finally, the contents are sent to the ISDN 5 through a data request S13 to the TE Layer 1 control unit 32.

Figure 7:
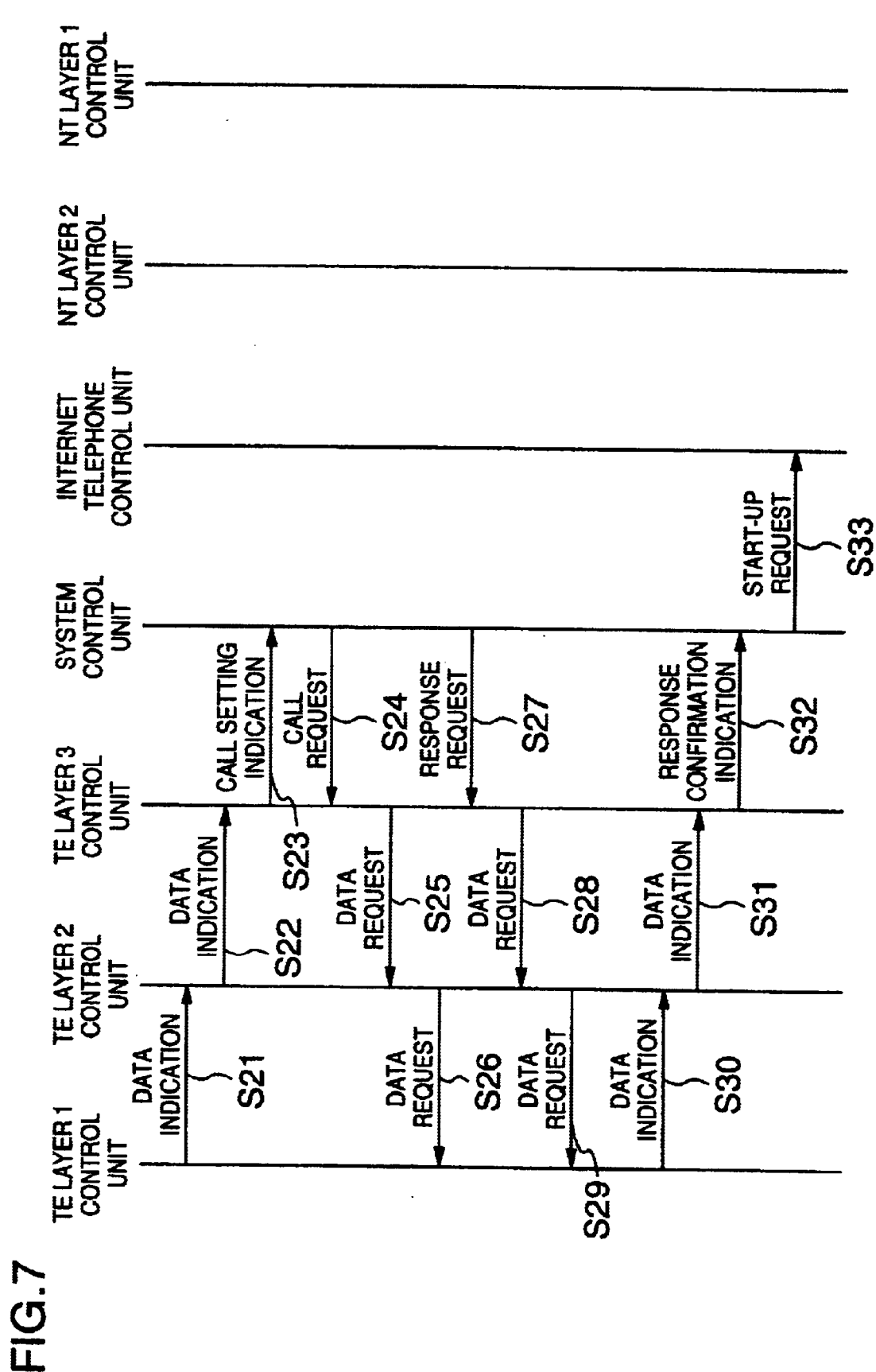
FIG. 7 is an operational sequence diagram for the Internet telephone apparatus according to Embodiments 1–9 of the present invention, when an incoming call is directed an Internet telephone.

Referring next to FIG. 7, explanation is given of an operational procedure involved in a connection to the Internet, made by the user of the telephone 7 with an aim to make a voice communication with the user of the telephone 8 through the Internet telephone apparatus 1 utilizing the Internet telephone service.

FIG. 7 is a sequence diagram for the Internet telephone apparatus according to Embodiment 1 when an incoming call is directed to the Internet telephone.

In FIG. 7, the user of the telephone 7 originates a call to the Internet telephone apparatus through the ISDN 5 with a telephone number previously given to him from the ITSP. In the Internet telephone apparatus 1, the TE Layer 1 control unit 32, which has received this call originated from the telephone 7, transmits a data indication S21 to the TE Layer 2 control unit 33. The TE Layer 2 control unit 33 controls detection of a Layer 2 header, error detection, and so on, and then sends information (in an information field) of the data indication S21 to the TE Layer 3 control unit 34 as a data indication S22. The TE Layer 3 control unit 34 analyzes the data indication S22 to recognize that the data indication S22 comprises a call setting message notifying of an incoming call, and responsively transmits a call setting indication S23 including Layer 3 information elements (an information element related to the call setting message and so on) to the system control unit 31, and accumulates the data indication S22. The incoming call determination unit 38 of the system control unit 31, upon receiving the call setting indication S23, compares a destination number information element included in the received call setting display 23 with a previously set dial-in number for an Internet telephone, and determines that this is an incoming call directed to the Internet telephone from the comparison result showing that they are coincident. Then, based on the determination the connection switching unit 39 sends a call request S24 and a response request S27 in sequence to the TE Layer 3 control unit 34. The TE Layer 3 control unit 34, upon receiving the call request S24, discards the contents of the accumulated data indication S22, and sends a data request 25 serving as a call message to the TE Layer 2 control unit 33. The TE Layer 2 control unit 33, upon receiving the data request S25, transmits a data request S26 to the TE Layer 1 control unit 32, causing the TE Layer 1 control unit 32 to send the call message to the ISDN 5.

Subsequently, the TE Layer 3 control unit 34 also receives the response request S27 from the system control unit 31, and similarly sends a data request S28 to the TE Layer 2 control unit 33. The TE Layer 2 control unit 33, which has received the data request S28, transmits a data request S29 to the TE Layer 1 control unit 32, causing the TE Layer 1 control unit 32 to send a response message to the ISDN 5.

Next, when a response confirmation message is sent from the ISDN 5 to the TE Layer 1 control unit 32 in response to the response message, the TE Layer 1 control unit 32 transmits a data indication S30 to the TE Layer 2 control unit 33 which in turn transmits a data indication S31 to the TE Layer 3 control unit 34. The TE Layer 3 control unit 34 analyzes the data indication S31 to recognize that the data indication S31 is associated with the response confirmation message, and responsively sends a response confirmation indication S32 to the system control unit 31. The incoming call determination unit 38 of the system control unit 31 determines from the reception of the response confirmation indication S32 that a line connection has been completed for the Internet telephone, and the connection switching unit 39 sends a start-up request S33 to the Internet telephone control unit 37 based on the determination. The Internet telephone control unit 37, in response to the start-up request S33, prompts the user of the telephone 7 to input an authentication number, the telephone number of the destination, and so on through voice guidance from the Internet telephone apparatus 1. Then, the Internet telephone control unit 37 confirms the authentication number of the user in the Internet telephone control center 3 through the Internet network 4, with the authentication number and the destination telephone number from the telephone 7, and then performs a connection control, including the passing of the destination telephone number and so on, between the Internet telephone apparatus 1 and the Internet telephone apparatus 2. The Internet telephone apparatus 2 originates a call to the called telephone 8 with the destination telephone number through the ISDN 6. When the user of the telephone 8 hooks off, a telephone communication state is entered between the Internet telephone apparatus 2 and the telephone 8 through the ISDN 6. With the foregoing operations, the users of the telephone 7 and the telephone 8 can make conversation through the control center 3 and the Internet telephone apparatus 1, 2.

As described above, the Internet telephone apparatus according to this embodiment is provided with the incoming call determination unit 38 which references a destination number information element, which is information on the telephone number of the destination side included in a call setting message, to determine that an incoming call is directed to the Internet telephone control unit when a telephone number indicated by the destination number information element is coincident with a dial-in number for an Internet telephone and to otherwise determine that an incoming call is directed to the access server; and the connection switching unit 39 for switching a communication connection to the Internet telephone control unit or to the access server based on the determination result of the incoming call determination unit 38, so that the connection can be switched to the Internet telephone control unit and to the access server in accordance with an individual call, when it is originated, thereby making it possible to provide the capabilities of achieving the Internet connection processing for both an Internet telephone and personal computer communication with a single line.

Embodiment 2

Next, an Internet telephone apparatus according to Embodiment 2 of the present invention will be explained with respect to its call origination processing method with reference to FIGS. 4 to 7.

Referring to FIG. 6, explanation is first give of an operational procedure involved in a connection to the Internet, made by the user of the personal computer 11 (FIG. 4) through the access server 9 (FIG. 4) for purposes of normal personal computer communications or the like.

The incoming call determination unit 38 of the system control unit 31 (both in FIG. 5), upon receiving a call setting indication S3 from the TE Layer 3 control unit 34 (FIG. 5) in response to a call originated by the user, compares an information transfer rate (from the destination to the source) information element indicative of the information transfer capability in communication capability information elements included in the received call setting indication S3 with a coding indicative of voice or 3.1 KHz audio, and determines that the call is an incoming call directed to the access server 9 from the comparison result showing that the two are not coincident.

The connection switching unit 39 sends an ignore request S4 to the TE Layer 3 control unit 34 based on the determination. Since subsequent operations are similar to those in Embodiment 1, explanation thereof is omitted.

Referring next to FIG. 7, explanation is given of an operational procedure involved in a connection to the Internet, made by the user of the telephone 7 through the Internet telephone apparatus 1 for purposes of making a voice communication with the user of the telephone 8 utilizing the Internet telephone service.

The incoming call determination unit 38 of the system control unit 31, upon receiving a call setting indication S23 from the TE Layer 3 control unit 34 in response to a call originated by the user, compares an information transfer rate (from the destination to the source) information element indicative of the information transfer capability in communication capability information elements included in the received call setting indication S23 with a coding indicative of voice or 3.1 KHz audio, and determines that the call is an incoming call directed to the Internet telephone from the comparison result showing that the two are coincident. The connection switching unit 9 sends a call request S24 to the TE Layer 3 control unit 34 based on the determination, and then sends a response request S27. Since subsequent operations are similar to those in Embodiment 1, explanation thereof is omitted.

As described above, the Internet telephone apparatus according to this embodiment is provided with the incoming call determination unit 38 which references the information transmission capability information element included in a call setting message for identifying whether an associated call is a voice communication or a digital (data) communication to determine that an incoming call is directed to the Internet telephone control unit if the information transmission capability information element indicates voice or 3.1 kHz audio and to otherwise determine that an incoming call is directed to the access server; and the connection switching unit 39 for switching a communication connection to the Internet telephone control unit or to the access server based on the determination result of the incoming call determination unit 38, so that a connection can be switched to the Internet telephone control unit or to the Internet telephone control unit or to the access server in accordance with an individual call, when it is originated, thereby making it possible to provide the capabilities of achieving the Internet connection processing for both the Internet telephone and the personal computer communications with a single line.

Embodiment 3

Next, an Internet telephone apparatus according to Embodiment 3 of the present invention will be described with respect to its call origination processing method with reference to FIGS. 4 to 7.

Referring to FIG. 6, explanation is first given of an operational procedure involved in a connection to the Internet, made by the user of the personal computer 11 (FIG. 4) through the access server 9 (FIG. 4) for purposes of normal personal computer communications or the like.

The incoming call determination unit 38 of the system control unit 31 (both in FIG. 5), upon receiving a call setting indication S3 from the TE Layer 3 control unit 34 (FIG. 5) in response to a call originated by the user, compares a source sub-address information element included in the received call setting indication S3 with a particular information sequence previously set or disclosed by the ITSP, and determines that the call is an incoming call directed to the access server 9 from the comparison result showing that the two are not coincident. The connection switching unit 39 sends an ignore request S4 to the TE Layer 3 control unit 34 based on the determination. Since subsequent operations are similar to those in Embodiment 1, explanation thereof is omitted.

Referring next to FIG. 7, explanation is given of an operational procedure involved in a connection to the Internet, made by the user of the telephone 7 through the Internet telephone apparatus 1 for purposes of making a voice communication with the user of the telephone 8 utilizing the Internet telephone service.

The incoming call determination unit 38 of the system control unit 31, upon receiving a call setting indication S23 from the TE Layer 3 control unit 34 in response to a call originated by the user, compares a source sub-address information element included in the received call setting indication S23 with a particular information sequence previously set or disclosed by the ITSP, and determines that the call is an incoming call directed to the Internet telephone from the comparison result showing that the two are coincident. The connection switching unit 39 sends a call request S24 to the TE Layer 3 control unit 34 based on the determination, and then sends a response request S27. Since subsequent operations are similar to those in Embodiment 1, explanation thereof is omitted.

As described above, the Internet telephone apparatus according to this embodiment is provided with the incoming call determination unit 38 which references the source sub-address information element included in a call setting message and indicative of a sub-address on the call originating side to determine that an incoming call is directed to the Internet telephone control unit if the source sub-address information element indicates particular information previously set or disclosed by the ITSP and to otherwise determine that an incoming call is directed to the access server; and the connection switching unit 39 for switching a communication connection to the Internet telephone control unit or to the access server based on the determination result of the incoming call determination unit 38, so that a connection can be switched to the Internet telephone control unit or to the access server in accordance with an individual call, when it is originated, thereby making it possible to provide the capabilities of achieving the Internet connection processing with a single line for both the Internet telephone and the personal computer communications.

Embodiment 4

Next, an Internet telephone apparatus according to Embodiment 4 of the present invention will be described with respect to its call origination processing method with reference to FIGS. 4 to 7.

Referring to FIG. 6, explanation is first given of an operational procedure involved in a connection to the Internet, made by the user of the personal computer 11 (FIG. 4) through the access server 9 (FIG. 4) for purposes of normal personal computer communications or the like.

The incoming call determination unit 38 of the system control unit 31 (both in FIG. 5), upon receiving a call setting indication S3 from the TE Layer 3 control unit 34 (FIG. 5) in response to a call originated by the user, compares a destination sub-address information element included in the received call setting indication S3 with a particular information sequence previously set or disclosed by the ITSP, and determines that the call is an incoming call directed to the access server 9 from the comparison result showing that the two are not coincident. The connection switching unit 39 sends an ignore request S4 to the TE Layer 3 control unit 34 based on the determination. Since subsequent operations are similar to those in Embodiment 1, explanation thereof is omitted.

Referring next to FIG. 7, explanation is given of an operational procedure involved in a connection to the Internet, made by the user of the telephone 7 through the Internet telephone apparatus 1 for purposes of making a voice communication with the user of the telephone 8 utilizing the Internet telephone service.

The incoming call determination unit 38 of the system control unit 31, upon receiving a call setting indication S23 from the TE Layer 3 control unit 34 in response to a call originated by the user, compares a destination sub-address information element included in the received call setting indication S23 with a particular information sequence previously set or disclosed by the ITSP, and determines that the call is an incoming call directed to the Internet telephone from the comparison result showing that the two are coincident. The connection switching unit 39 sends a call request S24 to the TE Layer 3 control unit 34 based on the determination, and then sends a response request S27. Since subsequent operations are similar to those in Embodiment 1, explanation thereof is omitted.

As described above, the Internet telephone apparatus according to this embodiment is provided with the incoming call determination unit 38 which references the destination sub-address information element included in a call setting message and indicative of a sub-address on the destination side to determine that an incoming call is directed to the Internet telephone control unit if the source sub-address information element indicates particular information previously set or disclosed by the ITSP and to otherwise determine that an incoming call is directed to the access server; and the connection switching unit 39 for switching a communication connection to the Internet telephone control unit or to the access server based on the determination result of the incoming call determination unit 38, so that a connection can be switched to the Internet telephone control unit or to the access server in accordance with an individual call, when it is originated, thereby making it possible to provide the capabilities of achieving the Internet connection processing for both the Internet telephone and the personal computer communications with a single line.

Embodiment 5

Next, an Internet telephone apparatus according to Embodiment 5 of the present invention will be described with respect to its call origination processing method with reference to FIGS. 4 to 7.

Referring to FIG. 6, explanation is first given of an operational procedure involved in a connection to the Internet, made by the user of the personal computer 11 (FIG. 4) through the access server 9 (FIG. 4) for purposes of normal personal computer communications or the like.

The incoming call determination unit 38 of the system control unit 31 (both in FIG. 5), upon receiving a call setting indication S3 from the TE Layer 3 control unit 34 (FIG. 5) in response to a call originated by the user, compares a Layer 1 protocol identifying information element for specifying the Layer 1 protocol within a lower layer alignment information element included in the received call setting indication S3 with ITU-T Recommendation G.711*-law or G.711A-law that defines a pulse code modulation for voice signals, and determines that the call is an incoming call directed to the access server 9 from the comparison result showing that the two are not coincident. The connection switching unit 39 sends an ignore request S4 to the TE Layer 3 control unit 34 based on the determination. Since subsequent operations are similar to those in Embodiment 1, explanation thereof is omitted.

Referring next to FIG. 7, explanation is given of an operational procedure involved in a connection to the Internet, made by the user of the telephone 7 through the Internet telephone apparatus 1 for purposes of making a voice communication with the user of the telephone 8 utilizing the Internet telephone service.

The incoming call determination unit 38 of the system control unit 31, upon receiving a call setting indication S23 from the TE Layer 3 control unit 34 in response to a call originated by the user, compares a Layer 1 protocol identifying information element for specifying the Layer 1 protocol within a lower layer alignment information element included in the received call setting indication S23 with ITU-T Recommendation G.711 $\mu$-law or G.711A-law that defines a pulse code modulation for voice signals, and determines that the call is an incoming call directed to the Internet telephone from the comparison result showing that the two are coincident. The connection switching unit 39 sends a call request S24 to the TE Layer 3 control unit 34 based on the determination, and then sends a response request S27. Since subsequent operations are similar to those in Embodiment 1, explanation thereof is omitted.

As described above, the Internet telephone apparatus according to this embodiment is provided with the incoming call determination unit 38 which references the Layer 1 protocol identifying information element included in a call setting message and indicative of the Layer 1 protocol to determine that an incoming call is directed to the Internet telephone control unit if the Layer 1 protocol identifying information element indicates ITU-T Recommendation G.711 $\mu$-law or G.711A-law and to otherwise determine that an incoming call is directed to the access server; and the connection switching unit 39 for switching a communication connection to the Internet telephone control unit or to the access server based on the determination result of the incoming call determination unit 38, so that a connection can be switched to the Internet telephone control unit or to the access server in accordance with an individual call, when it is originated, thereby making it possible to provide the capabilities of achieving the Internet connection processing with a single line for both the Internet telephone and the personal computer communications.

Embodiment 6

Next, an Internet telephone apparatus according to Embodiment 6 of the present invention, configured as illustrated in FIG. 4, will be described with respect to its call origination processing method with reference to FIGS. 4 to 7.

Referring to FIG. 6, explanation is first given of an operational procedure involved in a connection to the Internet, made by the user of the personal computer 11 (FIG. 4) through the access server 9 (FIG. 4) for purposes of normal personal computer communications or the like.

The incoming call determination unit 38 of the system control unit 31 (both in FIG. 5), upon receiving a call setting indication S3 from the TE Layer 3 control unit 34 (FIG. 5) in response to a call originated by the user, compares a user-to-user information element included in the received call setting indication S3 with a particular information sequence previously set or disclosed by the ITSP, and determines that the call is an incoming call directed to the access server 9 from the comparison result showing that the two are not coincident. The connection switching unit 39 sends an ignore request S4 to the TE Layer 3 control unit 34 based on the determination. Since subsequent operations are similar to those in Embodiment 1, explanation thereof is omitted.

Referring next to FIG. 7, explanation is given of an operational procedure involved in a connection to the Internet, made by the user of the telephone 7 through the Internet telephone apparatus 1 for purposes of making a voice communication with the user of the telephone 8 utilizing the Internet telephone service.

The incoming call determination unit 38 of the system control unit 31, upon receiving a call setting indication S23 from the TE Layer 3 control unit 34 in response to a call originated by the user, compares a user-to-user information element included in the received call setting indication S23 with a particular information sequence previously set or disclosed by the ITSP, and determines that the call is an incoming call directed to the Internet telephone from the comparison result showing that the two are coincident. The connection switching unit 39 sends a call request S24 to the TE Layer 3 control unit 34 based on the determination, and then sends a response request S27. Since subsequent operations are similar to those in Embodiment 1, explanation thereof is omitted.

As described above, the Internet telephone apparatus according to this embodiment is provided with the incoming call determination unit 38 which references the user-to-user information element included in a call setting message for use in communication of information between users to determine that an incoming call is directed to the Internet telephone control unit if the user-to-user information element indicates particular information previously set or disclosed by the ITSP and to otherwise determine that an incoming call is directed to the access server; and the connection switching unit 39 for switching a communication connection to the Internet telephone control unit or to the access server based on the determination result of the incoming call determination unit 38, so that a connection can be switched to the Internet telephone control unit or to the access server in accordance with an individual call, when it is originated, thereby making it possible to provide the capabilities of achieving the Internet connection processing with a single line for both the Internet telephone and the personal computer communications.

Embodiment 7

Next, an Internet telephone apparatus according to Embodiment 7 of the present invention, configured as illustrated in FIG. 4, will be described with respect to its call origination processing method with reference to FIGS. 4 to 7.

Explanation is first given of an operational procedure involved in a connection to the Internet, made by the user of the personal computer 11 through the access server 9 for purposes of normal personal computer communications or the like.

The system control unit 31 (FIG. 5), upon receiving a call setting indication S3 from the TE Layer 3 control unit 34 (FIG. 5) in response to a call originated by the user as illustrated in FIG. 6, performs the control for a connection to the public line 5 through a sequence from S24 to S32 illustrated in FIG. 7. The incoming call determination unit 38 determines that the call is an incoming call directed to the access server 9 from the fact that a tone signal from a modem cannot be detected from an analog line such as PSTN or the like, transmitted from the user, for a predetermined time period (for example, ten seconds) after a line connection has been established. The connection switching unit 39 sends an ignore request S4 (see FIG. 6) to the TE Layer 3 control unit 34. Since subsequent operations are identical to S5–S13 previously explained in connection with Embodiment 1, explanation thereof is omitted.

Referring next to FIG. 7, explanation is given of an operational procedure involved in a connection to the Internet, made by the user of the telephone 7 through the Internet telephone apparatus 1 for purposes of making a voice communication with the user of the telephone 8 through the Internet telephone.

As illustrated in FIG. 7, the system control unit 31, upon receiving a call setting indication S23 from the TE Layer 3 control unit 34 in response to a call originated by the user, performs the control for a connection to the public line 5 through a sequence from S24 to S32 illustrated in FIG. 7. The incoming call determination unit 38 determines that the call is an incoming call directed to the Internet telephone from the fact that a tone signal from a modem can be detected from an analog line such as PSTN or the like, transmitted from the user, within a predetermined time period (for example, ten seconds) after a line connection has been established. The connection switching unit 39 sends a start-up request S33 illustrated in FIG. 7 to the Internet telephone control unit 37 based on the determination. Since subsequent operations are similar to those in Embodiment 1, explanation thereof is omitted.

As described above, the Internet telephone apparatus according to this embodiment is provided with the incoming call determination unit 38 which attempts to detect a tone signal of a modem from an analog line such as PSTN or the like transmitted from the user for a predetermined time period after a line connection has been established in response to a call originated by the user, and determines that the call is an incoming call directed to the Internet telephone control unit for controlling the Internet telephone when the tone signal is detected within the predetermined time period while otherwise determines that the call is an incoming call directed to the access server for controlling communications such as personal computer communications or the like, so that a connection can be switched to the Internet telephone control unit or to the access server in accordance with an individual call, when it is originated, thereby making it possible to provide the capabilities of achieving the Internet connection processing with a single line for both the Internet telephone and the personal computer communications.

Embodiment 8

Next, an Internet telephone apparatus according to Embodiment 8 of the present invention, configured as illustrated in FIG. 4, will be described with respect to its call origination processing method with reference to FIGS. 4 to 7.

Referring to FIG. 6, explanation is first given of an operational procedure involved in a connection to the Internet, made by the user of the personal computer 11 through the access server 9 for purposes of normal personal computer communications or the like.

The incoming call determination unit 38 of the system control unit 31 (FIG. 5), upon receiving a call setting indication S3 from the TE Layer 3 control unit 34 (FIG. 5) in response to a call originated by the user, compares the current time with a preset time zone (for example, a time zone from 23:00 to 8:00 which is a time zone in which the Internet telephone utilization ratio is lower), and determines that the call is an incoming call directed to the access server 9 from the fact that the current time is included in the preset time zone. The connection switching unit 39 sends an ignore request S4 to the TE Layer 3 control unit 34 based on the determination. Since subsequent operations are similar to those in Embodiment 1, explanation thereof is omitted.

Referring next to FIG. 7, explanation is given of an operational procedure involved in a connection to the Internet, made by the user of the telephone 7 through the Internet telephone apparatus 1 for purposes of making a voice communication with the user of the telephone 8 utilizing the Internet telephone service.

The incoming call determination unit 38 of the system control unit 31, upon receiving a call setting indication S23 from the TE Layer 3 control unit 34 in response to a call originated by the user, compares the current time with the preset time zone (for example, the time zone from 23:00 to 8:00 which is a time zone in which the Internet telephone utilization ratio is lower), and determines that the call is an incoming call directed to the Internet telephone from the fact that the current time is not included in the preset time zone. The connection switching unit 39 sends a call request S24 to the TE Layer 3 control unit 34 based on the determination, and then sends a response request S27. Since subsequent operations are similar to those in Embodiment 1, explanation thereof is omitted.

As described above, the Internet telephone apparatus according to this embodiment is provided with the connection switching unit 39 which switches all calls originated by users in accordance with a preset time zone such that all the calls are directed to the Internet telephone control unit for controlling the Internet telephone or to the access server for controlling communications such as personal computer communications, so that the connection control can be switched between the Internet telephone and the personal computer communications depending on the time zone, thereby making it possible to improve the utilization ratio of the apparatus by setting a time zone presenting a lower Internet telephone utilization ratio exclusively for a connection to the access server.

Embodiment 9

Next, an Internet telephone apparatus according to Embodiment 9 of the present invention, configured as illustrated in FIG. 4, will be described with respect to its call origination processing method with reference to FIGS. 4 to 7.

Referring to FIG. 6, explanation is first given of an operational procedure involved in a connection to the Internet, made by the user of the personal computer 11 through the access server 9 for purposes of normal personal computer communications or the like.

The incoming call determination unit 38 of the system control unit 31 (FIG. 5), upon receiving a call setting indication S3 from the TE Layer 3 control unit 34 (FIG. 5) in response to a call originated by the user, compares the current time with a preset time zone (for example, a time zone from 10:00 to 17:00 which is a time zone in which the Internet telephone utilization ratio is higher), and determines the call is an incoming call directed to the access server 9 from the fact that the current time is not included in the preset time zone. The connection switching unit 39 sends an ignore request S4 to the TE Layer 3 control unit 34 based on the determination. Since subsequent operations are similar to those in Embodiment 1, explanation thereof is omitted.

Referring next to FIG. 7, explanation is given of an operational procedure involved in a connection to the Internet, made by the user of the telephone 7 through the Internet telephone apparatus 1 for purposes of making a voice communication with the user of the telephone 8 utilizing the Internet telephone service.

The incoming call determination unit 38 of the system control unit 31, upon receiving a call setting indication S23 from the TE Layer 3 control unit 34 in response to a call originated by the user, compares the current time with a preset time zone (for example, the time zone from 10:00 to 17:00 which is a time zone in which the Internet telephone utilization ratio is higher), and determines the call is an incoming call directed to the Internet telephone from the fact that the current time is included in the preset time zone. The connection switching unit 39 sends a call request S24 to the TE Layer 3 control unit 34 based on the determination, and then sends a response request S27. Since subsequent operations are similar to those in Embodiment 1, explanation thereof is omitted.

As described above, the Internet telephone apparatus according to this embodiment is provided with the connection switching unit 39 which switches all calls originated by users in accordance with a preset time zone such that all the calls are directed to the Internet telephone control unit for controlling the Internet telephone or to the access server for controlling communications such as personal computer communications, so that the connection control can be switched between the Internet telephone and the personal computer communications depending on the time zone, thereby making it possible to improve the utilization ratio of the apparatus by setting a time zone presenting a higher Internet telephone utilization ratio exclusively for a connection to the Internet telephone.

Embodiment 10

Figure 8:
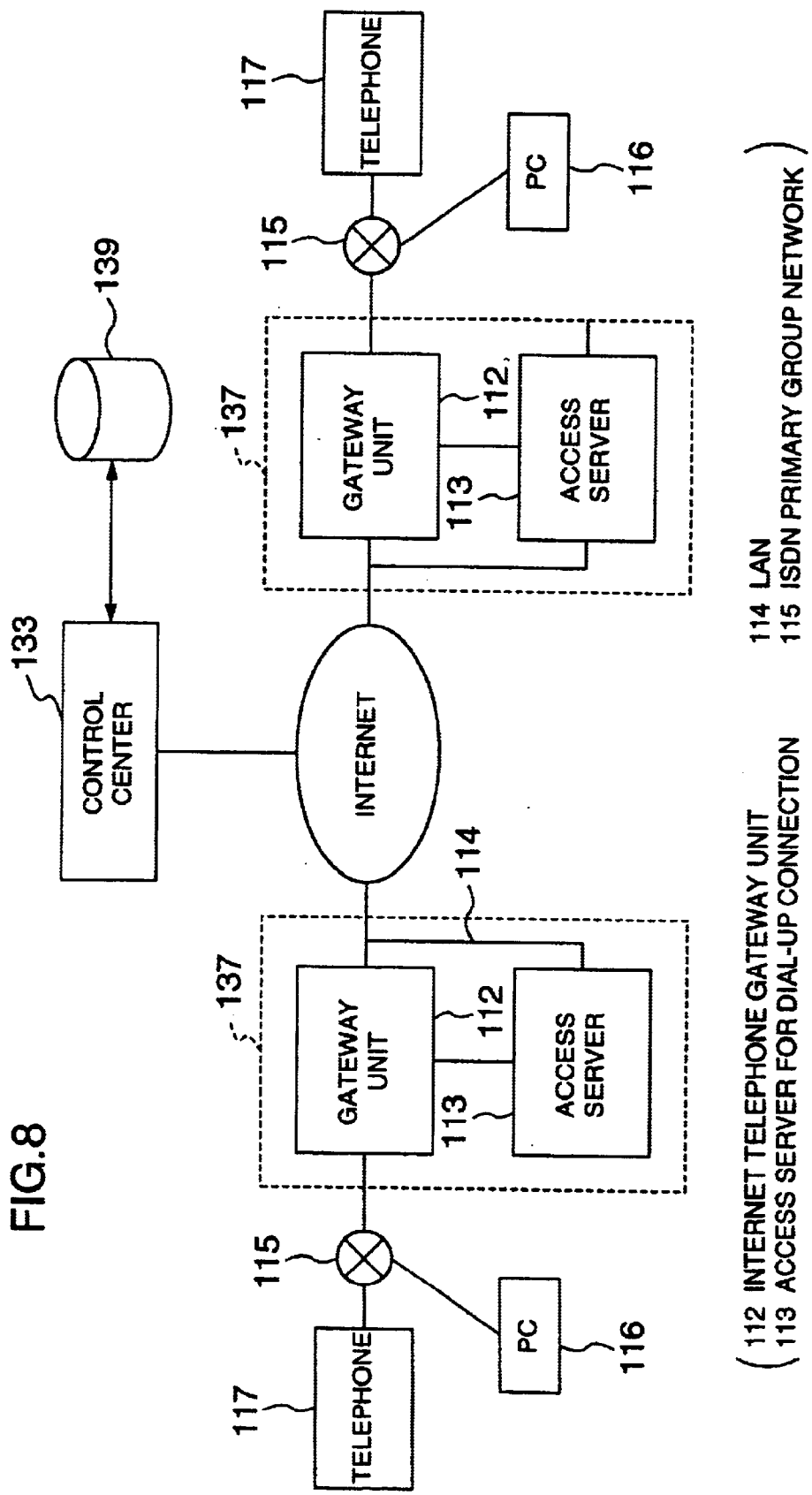
FIG. 8 illustrates the configuration of an Internet telephone gateway system including an Internet telephone apparatus according to Embodiment 10 of the present invention.
Figure 9:
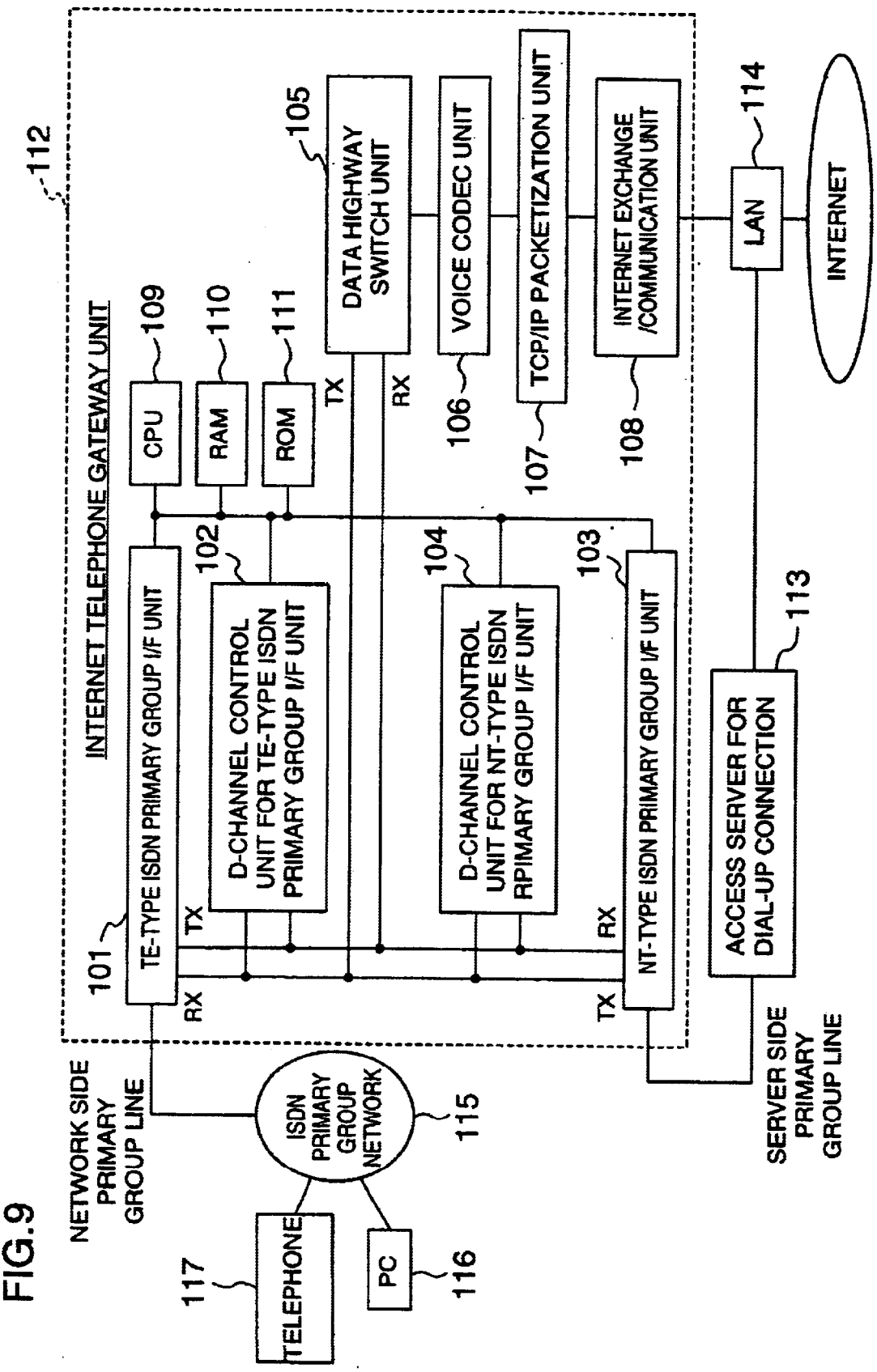
FIG. 9 is a functional block diagram of an Internet telephone apparatus according to Embodiment 10 of the present invention.

FIG. 8 illustrates the configuration of an Internet telephone gateway system including an Internet telephone apparatus according to Embodiment 10 of the present invention, and FIG. 9 is a functional block diagram of the Internet telephone apparatus and periphery circuits. Referring specifically to FIG. 8, the Internet telephone gateway system comprises an Internet telephone gateway unit 112; an access server 113 for dial-up connection; a local area network (LAN) 114; an ISDN (Integrated Service Digital Network) primary group network 115; a personal computer (PC) 116; a telephone 117; a control center 133; an Internet telephone apparatus (which may be also referred to as the "ISP") 137; and a database 139.

FIG. 9 shows a terminal (TE) type ISDN primary group interface (I/F) unit 101; a D-channel control unit 102 for the TE-type ISDN primary group I/F unit 101; a network terminal (NT) type ISDN primary group I/F unit 103; a D-channel control unit 104 for the NT-type ISDN primary gourp I/F unit; a data highway switch unit 105; an voice codec unit 106; a TCP/IP packetization unit 107; an Internet exchange/communication unit 108; a central processing unit (CPU) 109; a random access memory (RAM) 110; a read only memory (ROM) 111; an Internet telephone gateway unit 112; an access server 113 for dial-up connection; a LAN 114; an ISDN primary group network 115; a PC 116; and a telephone 117.

With the telephone 117, a call is placed to the Internet telephone gateway unit 112 through the ISDN primary group network 115 and through a general public line network. In this event, when a service-in number has been previously set for an Internet telephone, for example, utilizing a dial-in service for the ISDN primary group line, an incoming call intended for the Internet telephone can be distinguished from an incoming call intended for dial-up connection. Any other distinguishing means, such as a method which distinguishes them using a sub-address of the ISDN for an Internet telephone, may be used instead as long as a reliable distinction can be carried out. The termination processing may be performed such that negotiations are fixed among the ISDN primary group network 115, the TE-type ISDN primary group I/F unit 101, and the D-channel control unit 102 to establish a call.

From a TX (frame transmission) signal and an RX (frame reception) signal from the TE-type ISDN primary group I/F unit 101, the data highway switching unit 105 extracts a B-channel bit stream for an established call which is compressed/decompressed in the voice codec unit 106. This signal is communicated with an external Internet telephone gateway unit by the TCP/IP packetization unit 107 and the Internet exchange/communications unit 108 through the LAN 114 and also through a router or the like. Since the communication with the external gateway unit is carried out by the method previously described in the "Description of Related Art" above, explanation thereof is omitted here.

On the other hand, when a call is placed to a previously set telephone number for dial-up connection, negotiations are fixed between the ISDN primary group network 115 and the TE-type ISDN primary group I/F unit 101 and the D-channel control unit 102 to establish a call. Simultaneously, a dial-up connection is set in the D-channel control unit 104 for the NT-type ISDN primary group I/F under the control of the CPU 109, the RAM 110, and the ROM 111. Then, the TX and RX signals from the TE-type ISDN primary group I/F unit 101 are inputted to TX and RX terminals of the NT-type ISDN primary group I/F unit 103, respectively, and reassembled as a network signal to the access server side primary group I/F unit, which is connected to the access server 113 for dial-up connection. In this event, a call is established between the access server 113 for dial-up connection and the NT-type ISDN primary group I/F unit 103 and the D-channel control unit 104 for communication. In this event, since it is previously known that the TX and RX signals to the data highway switch unit 105 are for dial-up connection, the processing after the connection may be canceled by the CPU 109.

For the operation involved in the reception of an Internet telephone call from an external gateway, the CPU 109 is monitoring the states of the TE D-channel control unit 102 and the NT D-channel control unit 104, so that an empty channel for TE D-channel control may be utilized to establish a call with the primary group network, and the TX and RX signals from the data highway switch unit 5 may be assembled in the TE-type ISDN primary group I/F unit 101 to make a signal connection to the primary group network.

For a call request from the access server side, a call is established between the access server 113 for dial-up connection and the NT-type D-channel control unit 104 to output TX and RX signals through a specified empty channel onto RX and TX highways. In this event, since the CPU 109 controls the specified channel to prevent the TX and RX signals from colliding with a serial output for the Internet telephone from the data highway switch unit 105, the data highway switch unit 5 and the TE/NT-type primary group I/F units 101, 103 must operate in synchronism. The synchronized operation can be accomplished with a clock which serves as a master. Subsequently, a call is established between the TE D-channel control unit 102 and the TE-type ISDN primary group I/F unit 101 and the primary group network 115 for communication.

As described above, in an Internet telephone apparatus having an ISDN primary group I/F unit, it is possible to support both the Internet telephone connection and the Internet dial-up connection using a conventional line facility for the internet dial-up connection without requiring any modification.

Embodiment 11

Figure 10:
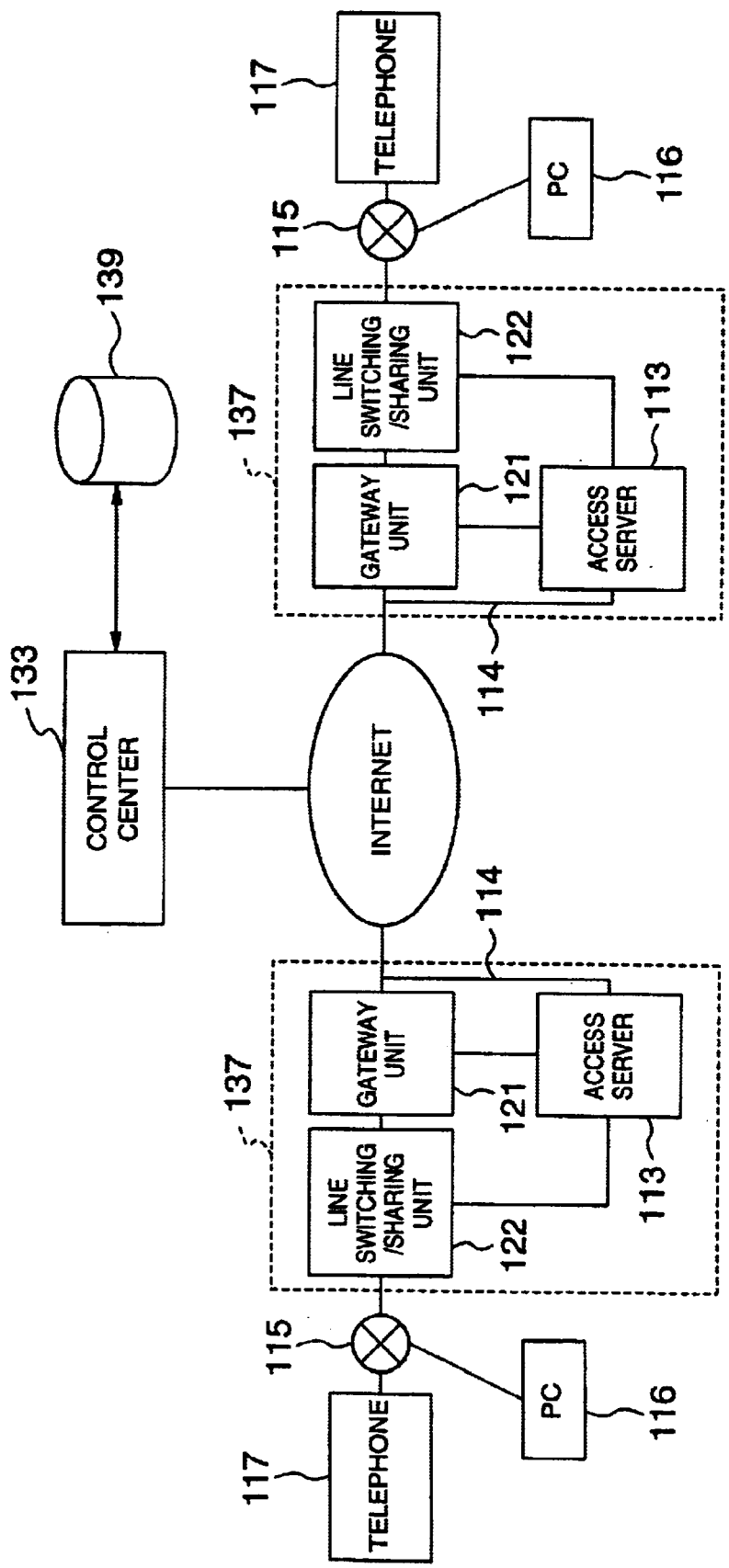
FIG. 10 illustrates the configuration of an Internet telephone gateway system including an Internet telephone apparatus according to Embodiment 11 of the present invention.
Figure 11:
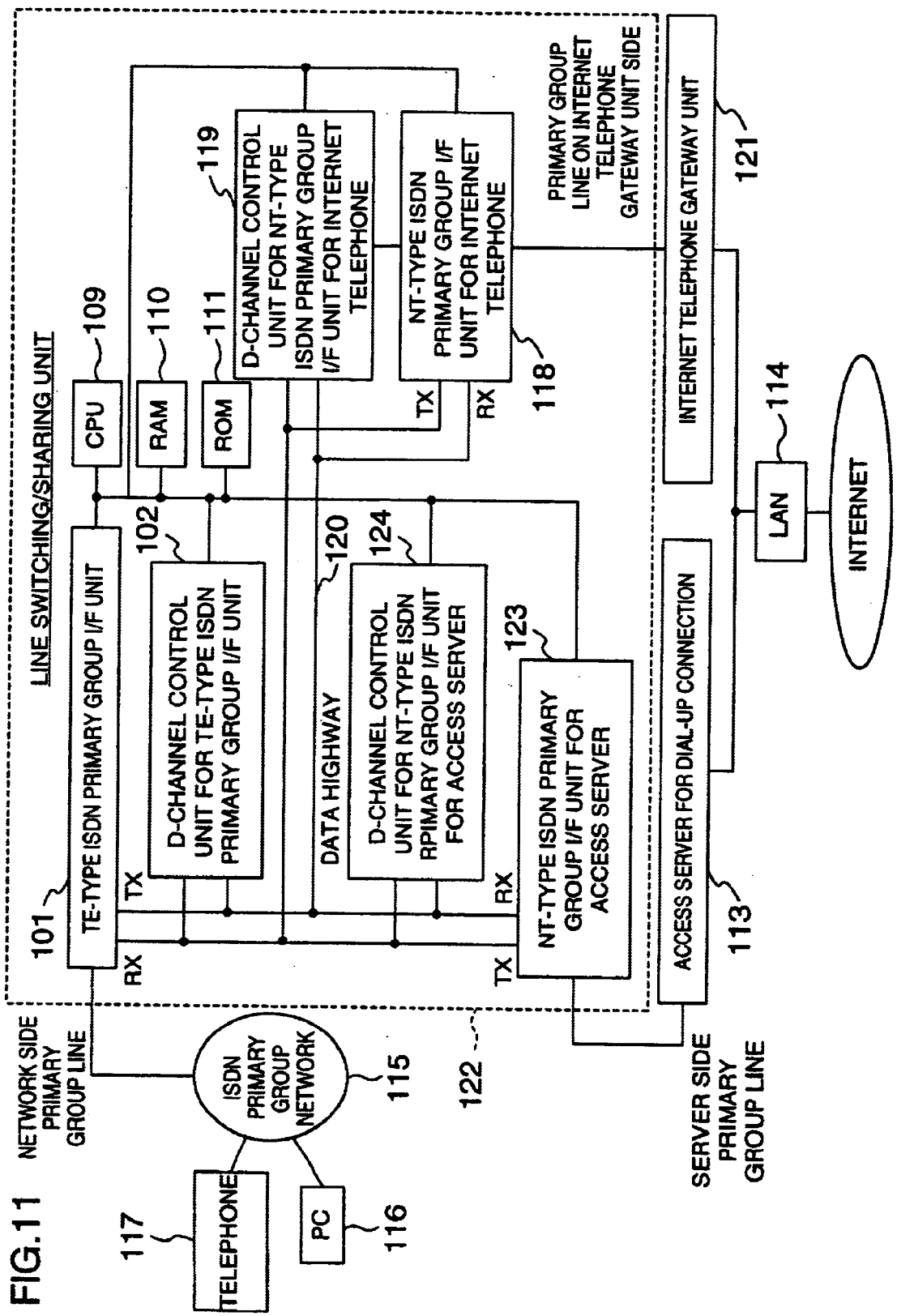
FIG. 11 is a functional block diagram of the Internet telephone apparatus according to Embodiment 11 of the present invention.

FIG. 10 illustrates the configuration of an Internet telephone gateway system including an Internet telephone apparatus according to Embodiment 11 of the present invention, and FIG. 11 is a functional block diagram of the Internet telephone apparatus and periphery circuits. Parts in FIG. 10 identical to those in Embodiment 10 illustrated in FIG. 8 are designated the same reference numerals. Embodiment 11 differs from Embodiment 10 in the provision of an Internet telephone gateway unit 121, in place of the Internet telephone gateway unit 112, and the addition of a line switching/sharing unit 122.

FIG. 11 shows a TE-type ISDN primary group interface (I/F) unit 101; a D-channel control unit 102 for the TE-type ISDN primary group I/F unit 101; an NT-type ISDN primary group I/F unit 118 for the Internet telephone; a D-channel control unit 119 for the NT-type ISDN primary group I/F unit 118; an NT-type ISDN primary group I/F unit 123 for an access server; a D-channel control unit 124 for the NT-type ISDN primary group I/F unit 123; a CPU 109; a RAM 110; a ROM 111; an access server 113 for dial-up connection; a LAN 114; an ISDN primary group network 115; a PC 116; a telephone 117; a data highway 120; an Internet telephone gate way unit 121; and the line switching/sharing unit 122.

With the telephone 117, a call is placed to the line switching/sharing unit 122 through the ISDN primary group network 115 and through a general public line network. In this event, when a service-in number has been previously set for an Internet telephone, for example, utilizing a dial-in service for the ISDN primary group line, an incoming call intended for the Internet telephone can be distinguished from an incoming call intended for dial-up connection. Any other distinguishing means, such as a method which distinguishes them using a sub-address of the ISDN for an Internet telephone, may be used instead as long as a reliable distinction can be carried out. The termination processing may be performed such that negotiations are started between the ISDN primary group network 115 and the TE-type ISDN primary group I/F unit 101 and the D-channel control unit 102 to establish a call.

Subsequently, a TX (frame transmission) signal and an RX (frame reception) signal transferred from the TE-type ISDN primary group I/F unit 101 onto the data highway 120 are connected to an RX terminal and a DX terminal for the NT-type ISDN primary group I/F unit 118 for the Internet telephone by the NT-type ISDN primary group I/F D-channel control unit 119 for the Internet telephone, and reassembled as a network signal to the ISDN primary group I/F unit on the Internet telephone gateway unit 121 side. Afterward, a call is established between the internet telephone gateway unit 121 and the NT-type ISDN primary group I/F unit 118 for the Internet telephone and the D-channel control unit 119 so that a communication can be made with the Internet telephone gateway unit 121 through the reassembled network signal.

On the other hand, when a call is placed to a previously set telephone number for dial-up connection, negotiations are first fixed between the ISDN primary group network 115 and the TE-type ISDN primary group I/F unit 101 and the D-channel control unit 102 to establish a call. Simultaneously, a dial-up connection is set in the D-channel control unit 119 for the NT-type ISDN primary group I/F for the Internet telephone under the control of the CPU 109, the RAM 110, and the ROM 111. Then, the TX and RX signals from the TE-type ISDN primary group I/F unit 101 are inputted to TX and RX terminals of the NT-type ISDN primary group I/F unit 123 for an access server, respectively, and reassembled as a network signal to the access server side primary group I/F unit, which is connected to the dial-up connection access server 113. Afterward, a call is established between the access server 113 for dial-up connection and the NT-type ISDN primary group I/F unit 123 for access server and the D-channel control unit 124 for communication.

For the operation involved in the reception of an Internet telephone call from an opposite side gateway, a call is established between the Internet telephone gateway unit 121 and the NT D-channel control unit 119 for the Internet telephone to output TX and RX signals onto RX and TX highways through a specified empty channel of the NT-type ISDN primary group I/F unit 118 for the Internet telephone. Subsequently, the TX and RX signals are connected to an RX terminal and a DX terminal of the TE-type ISDN primary group I/F unit 101, respectively, by the TE-type primary group I/F D-channel control unit 102, and reassembled as a network signal to the TE side ISDN primary group I/F unit. Afterward, a call may be established between the TE D-channel control unit 102 and the ISDN primary group network 115 to connect the reassembled network signal produced in the TE-type ISDN primary group I/F unit 101 to the ISDN primary group network 115.

For a call request from the access server side, a call is established between the access server 113 for dial-up connection and the D-channel control unit 124 to output TX and RX signals through a specified empty channel onto RX and TX highways. In this event, since the CPU 109 controls the specified channel to prevent the TX and RX signals from colliding with a serial output for the Internet telephone from the NT-type ISDN primary group I/F unit 118 for the Internet telephone, the TE/NT-type primary group I/F units 101, 123, 118 must operate in synchronism. The synchronized operation can be accomplished with a clock which serves as a master. The TX and RX signals are connected to the RX terminal and the DX terminal of the TE-type ISDN primary group I/F unit 101, respectively, by the TE-type primary group I/F D-channel control unit 102, and are reassembled as a network signal to the TE-side ISDN primary group I/F unit 101. Afterward, a call may be established between the TE-type D-channel control unit 102 and the ISDN primary group network 115 to connect the reassembled network signal produced in the TE-type ISDN primary group I/F unit 101 to the ISDN primary group network 115.

As described above, in an Internet telephone apparatus having an ISDN primary group I/F unit, it is possible to support both the Internet telephone connection and the Internet dial-up connection using a conventional line facility for the internet dial-up connection without requiring any modification.

It will be appreciated from the foregoing description that the Internet telephone apparatus of the present invention can switch a single line to share the same between the Internet dial-up connection and the Internet telephone, so that the Internet telephone can be realized without incurring the Internet service provider (ISP) to newly increase an investment for a line facility.

What is claimed is:

1. An Internet telephone gateway system having an ISDN primary group as a public line network interface (I/F), comprising:

a terminal function unit for an ISDN primary group network including a B-channel modulation/demodulation unit and a D-channel control unit;

a network function unit for reassembling an ISDN primary group signal from a B-channel modulated/demodulated signal and a D-channel control signal to enable a primary group connection to an access server for dial-up connection;

determination means for determining whether an access from a network interface user of the ISDN primary group is a request for a dial-up connection using a modem for a personal computer or a request for an Internet telephone connection from a telephone; and line switching/line sharing means comprising a network ISDN primary group interface on an Internet telephone gateway side and a D-channel control unit associated therewith and a terminal interface for the ISDN primary group network and a D-channel control unit associated therewith, and a network ISDN primary group interface on an access server side and a D-channel control unit associated therewith, wherein said Internet telephone gateway system is connected to an access server for dial-up connection through said network function unit for a dial-up connection using a modem for a personal computer, so that a line can be switched and shared between an Internet telephone and a dial-up connection using the modem for a personal computer.

* * * * *